United States Patent
Day et al.

(10) Patent No.: US 7,711,903 B2
(45) Date of Patent: May 4, 2010

(54) PRELOADING TRANSLATION BUFFERS

(75) Inventors: Michael N. Day, Round Rock, TX (US); Jonathan J. DeMent, Austin, TX (US); Charles R. Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 11/621,315

(22) Filed: Jan. 9, 2007

(65) Prior Publication Data

US 2007/0113044 A1 May 17, 2007

Related U.S. Application Data

(63) Continuation-in-part of application No. 10/759,941, filed on Jan. 16, 2004, now abandoned.

(51) Int. Cl.
*G06F 13/00* (2006.01)
*G06F 9/26* (2006.01)
*G06F 12/12* (2006.01)

(52) U.S. Cl. .................. 711/133; 711/159; 711/205; 711/E12.057; 711/E12.061

(58) Field of Classification Search .................. None
See application file for complete search history.

(56) References Cited

U.S. PATENT DOCUMENTS

| 5,493,660 | A | 2/1996 | DeLano et al. |
| 5,699,543 | A | 12/1997 | Saxena |
| 5,918,250 | A | 6/1999 | Hammond |
| 5,918,251 | A | * 6/1999 | Yamada et al. ............. 711/207 |
| 5,983,329 | A | 11/1999 | Thaler et al. |
| 6,212,613 | B1 | 4/2001 | Belair |
| 6,249,906 | B1 | 6/2001 | Levine et al. |
| 6,766,435 | B1 | 7/2004 | Aglietti et al. |
| 6,886,085 | B1 | 4/2005 | Shuf et al. |
| 2003/0065890 | A1* | 4/2003 | Lyon ......................... 711/141 |
| 2005/0160229 | A1 | 7/2005 | Johns et al. |

FOREIGN PATENT DOCUMENTS

JP 2004-280623 10/2004

* cited by examiner

*Primary Examiner*—Reginald G Bragdon
*Assistant Examiner*—Eric S Cardwell
(74) *Attorney, Agent, or Firm*—Stephen R. Tkacs; Stephen J. Walder, Jr.; Matthew B. Talpis

(57) ABSTRACT

A mechanism is provided for efficiently managing the operation of a translation buffer. The mechanism is utilized to pre-load a translation buffer to prevent poor operation as a result of slow warming of a cache. A software pre-load mechanism may be provided for preloading a translation look aside buffer (TLB) via a hardware implemented controller. Following preloading of the TLB, control of accessing the TLB may be handed over to the hardware implemented controller. Upon an application context switch operation, the software preload mechanism may be utilized again to preload the TLB with new translation information for the newly active application instance.

18 Claims, 7 Drawing Sheets

PRELOADING TRANSLATION BUFFERS

RELATED APPLICATION

This application is a continuation-in-part of commonly assigned and U.S. patent application Ser. No. 10/759,941, entitled "Method and Apparatus for Preloading Translation Buffers," filed on Jan. 16, 2004 now abandoned.

BACKGROUND

1. Technical Field

The invention relates generally to translation mechanisms in a computer architecture and, more particularly, to efficiently managing a translation mechanism to prevent problems associated with "warming" a translation cache.

2. Description of Related Art

Many of today's processor architectures provide a translation mechanism for converting an effective address (EA) used by an application into a real address (RA) used for referencing real storage. One example of such a processor architecture is PowerPC™. The translation process uses a translation table to translate an EA to an RA. The translation table, or page table, is typically stored in memory. For performance reasons, a typical implementation of the translation mechanism uses a cache and/or buffering structure to hold recently used translations. This structure is referred to as a Translation Lookaside Buffer (TLB) in PowerPC™. Each instruction using an EA causes a lookup in the TLB. When a translation is not found in the TLB (for example, there is a TLB demand miss), a hardware state machine or software routine is invoked to load the requested translation.

As with any caching mechanism, latency and bandwidth suffers when the cache does not contain a substantial amount of valid information required by an application. This condition is referred to as a "cold" cache. When a translation cache is cold, each access to a new area in storage causes a hardware or software action to be performed to load the requested translation. These demand misses continue until the translation caches are loaded with the most frequently used translations (for example, the translation cache is "warmed").

The additional latency and bandwidth degradation caused by the initial demand misses increase the runtime of an application. This condition typically occurs when a program is first run or when the processor swaps from one task to another, commonly referred to as the startup penalty. The startup penalty results in differences between the runtime of an application when executed on a "cold" versus a "warm" cache.

The startup penalty can be acceptable for non-real-time applications. However, a real-time application should account for the worst-case latencies and bandwidth to guarantee a task can be completed in a specific amount of time (for example, a deadline). Therefore, real-time applications should account for the performance of a "cold" cache and, typically, cannot take full advantage of the system performance. In addition, a real-time application that does not properly account for the performance differences between a "cold" and "warm" translation cache can miss a deadline.

Therefore, there is a need for a method and/or apparatus for avoiding the performance penalty of warming a cold cache that addresses at least some of the problems associated with the conventional demand miss methods and apparatuses for warming a cold translation cache.

SUMMARY

In one illustrative embodiment, a method of preloading data into a translation look-aside buffer (TLB) array is provided. The method may comprise responsive to detecting, by a software preload mechanism, a write to one or more designated registers indicating a desire to preload data for an application instance, initiating the preloading of data into the TLB array using a software preload mechanism and performing the preloading of data into the TLB array using both the software preload mechanism and a hardware implemented controller that controls access to the TLB array. The method may further comprise managing the TLB array by the hardware implemented controller after preloading of the data into the TLB array.

In a further illustrative embodiment, a hardware implemented controller is provided. The hardware implemented controller may comprise control state machine logic, a first interface, coupled to the control state machine logic, for communicating with a software preload mechanism, and a second interface, coupled to the control state machine logic, for communicating with a TLB array. The software preload mechanism, via the first interface, may initiate preloading of data into the TLB array responsive to the software preload mechanism detecting a write to one or more designated registers indicating a desire to preload data for an application instance. The preloading of data into the TLB array may be performed using both the software preload mechanism and the control state machine logic of the hardware implemented controller. The TLB array may be managed by the control state machine logic of the hardware implemented controller after preloading of the data into the TLB array.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

In the following discussion, numerous specific details are set forth to provide a thorough understanding of the present invention. However, those skilled in the art will appreciate that the present invention can be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein can be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
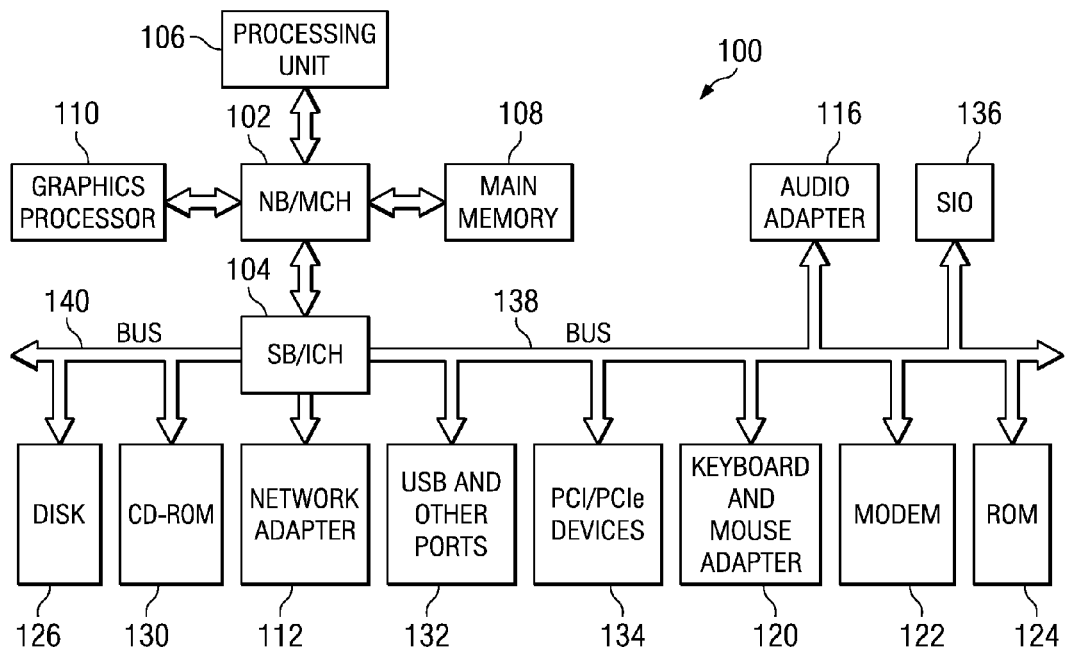
FIG. 1 is an exemplary block diagram of a data processing system in which exemplary aspects of the illustrative embodiments may be implemented.

With reference now to the figures and in particular with reference to FIG. 1, an exemplary diagram of data processing system is provided in which illustrative embodiments of the present invention may be implemented. It should be appreciated that FIG. 1 is only exemplary and is not intended to assert or imply any limitation with regard to the systems or environments in which aspects or embodiments of the present invention may be implemented. Many modifications to the depicted systems and environments may be made without departing from the spirit and scope of the present invention.

FIG. 1 is a block diagram of an exemplary data processing system in which aspects of the illustrative embodiments may be implemented. Data processing system 100 is an example of a computer, such as server or client computing device, in which computer usable code or instructions implementing the processes, hardware, and/or software for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as hard disk drive (HDD) 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

As discussed above, in known systems, the translation look-aside buffer is managed, and thus "warmed," either by way of a software routine or a hardware state machine that loads requested translations. There currently is no ability to concurrently utilize both software routines and hardware state machines to manage a translation look-aside buffer (TLB). The illustrative embodiments provide a mechanism by which a TLB may be preloaded using one or more TLB software preload routines. Once the TLB is preloaded, control is passed to one or more hardware state machines to handle TLB misses and reloading of translations into the TLB. Switching between software preload routines and hardware state machine based management of the TLB may be performed many times, such as when an application instance is initially instantiated, when a context switch is performed between application instances, or the like.

Figure 2:
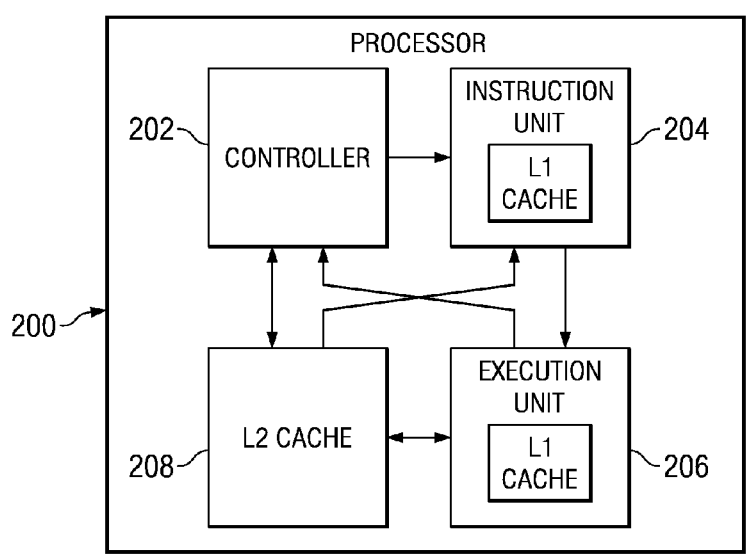
FIG. 2 is an exemplary block diagram of a processor in which the illustrative embodiments may be implemented.

Referring now to FIG. 2, an exemplary block diagram of a processor 200 is provided in accordance with one illustrative embodiment. Processor 200 includes controller 202, which controls the flow of instructions and data into and out of processor 200. Controller 202 sends control signals to instruction unit 204, which includes an L1 cache. Instruction unit 204 issues instructions to execution unit 206, which also includes an L1 cache. Execution unit 206 executes the instructions and holds or forwards any resulting data results to, for example, L2 cache 208. In turn, execution unit 206 retrieves data from L2 cache 208 as appropriate. Instruction unit 204 also retrieves instructions from L2 cache 208 when necessary. Controller 202 sends control signals to control storage or retrieval of data from L2 cache 208. Processor 200 may contain additional components not shown, and is merely provided as a basic representation of a processor and does not limit the scope of the present invention.

The processor 200 may obtain data/instructions from a local memory 220 via a north bridge and memory controller hub (NB/MCH) 210. The data/instructions from the local memory 220 may be loaded into the L2 cache 208 for quick and efficient access by the controller 202, instruction unit 204, and execution unit 206.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
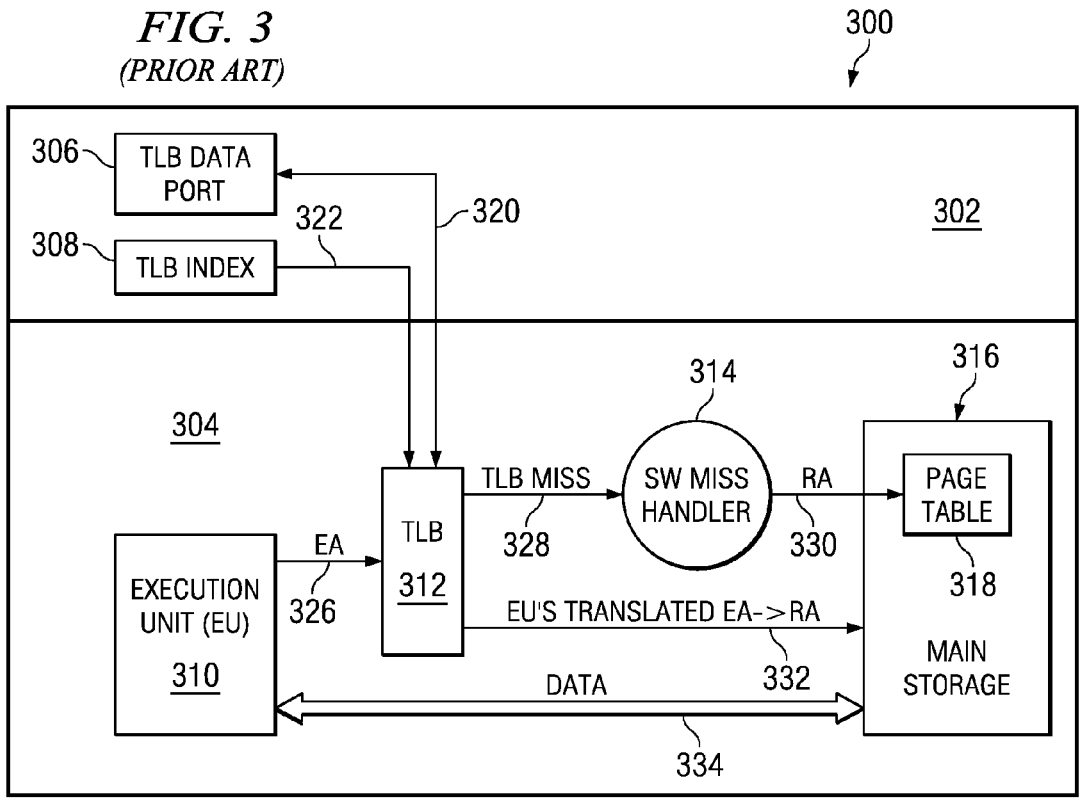
FIG. 3 is a block diagram depicting a conventional software-controlled translation mechanism.

Referring to FIG. 3 of the drawings, the reference numeral 300 generally designates a conventional software-controlled translation mechanism implementation. The translation mechanism implementation 300 comprises translation mechanism 304 and a software TLB management interface 302. The translation mechanism 304 comprises an Execution Unit (EU) 310, a Translation Look-aside Buffer (TLB) 312, a software miss handler 314, and a main storage 316. The main storage 316 further includes a page table 318. In addition, main storage 316 can also include memory mapped I/O devices and registers. The software TLB management interface 302 comprises a TLB data port 306 and a TLB index 308.

Within the translation mechanism implementation 300, there is a plurality of interconnected devices that each perform specific tasks. The EU 310 executes instructions, such as instructions contained in an executable file. Instructions using an Effective Address (EA) to reference main storage 316 cause the EU 310 to forward the EA to the TLB 312 for translation. The TLB 312 searches a translation buffer or cache for a translation for the EA.

If there does not exist a translation for the EA issued by the EU 310, then the software miss handler 314 searches for the unavailable, but required, translation in the page table 318 by computing the proper RA to locate the translation entry needed to translate the EA provided by the EU 310 in the page table 318. The software miss handler 314 is typically executed in the EU 310 or another processor in the system.

Once the proper translation has been found for the requested EA, the translation is loaded into the TLB 312, utilizing the software control interface 302. The translation can now be used for future reference and the current EA is converted into a Real Address (RA) based on the data found in the page table 318 and loaded into the TLB 312. If the translation is not found in the page table 318, the software miss handler 314 typically invokes a separate software mechanism (not shown) to resolve the translations missing in the page table 318. Missing translations result due to certain portions of the page table 318 being swapped to a mass media device, such as a hard disk drive (HDD), to more efficiently make use of processor memory. Such swapping is typically performed when translation entries in the swapped portion of the page table 318 have not been used in a lengthy period of time.

Within the translation mechanism 304, there exist a variety of connections to allow for the operation of the translation mechanism 304 as described. The EU 310 is coupled to the TLB 312 through a first communication channel 326, wherein the first communication channel 326 transfers an EA to the TLB 312. The TLB 312 is coupled to the Software TLB management interface 302 through a second communication channel 320 and a third communication channel 322. The second communication channel 320 and the third communication channel 322 each provide control data to the TLB 312. Also, the second communication channel 320 and the third communication channel 322 are used by the Software Miss Handler 314 to load translations found in the Page Table 318 into the TLB 312.

The TLB 312 is further coupled to the Software Miss Handler 314 through a fourth communication channel 328, wherein a TLB Miss is communicated from the TLB 312 to the Software Miss Handler 314. TLB 312 is also coupled to the Main Storage 316 through a fifth communication channel 332, wherein an EU's 310 translated RA is communicated from the TLB 312 to the main storage 316.

The software miss handler 314 is coupled to the page table 318 through a sixth communication channel 330. The sixth communication channel 330 is used by the software miss handler 314 to search the page table 318 for the translations missing in the TLB 312. Also, the EU 310 is coupled to the main storage 316 through a seventh communication channel 334, wherein data is intercommunicated between the EU and the main storage 316.

Within the Software TLB management interface 302, there exists a variety of connections to allow for the operation of the interface. The TLB data port 306 is coupled to the TLB 312 of the translation mechanism 304 through the second communication channel 320, wherein translation data is transferred from the TLB Data Port 306 to the TLB 312. The TLB data port 306 provides a communication port for delivering missing translations to the TLB 312.

The TLB index 308 is coupled to the TLB 312 of the translation mechanism through the third communication channel 322. Index data is communicated from the TLB index 308 to the TLB 312 through the second communication channel 322. The TLB index 308 contains the buffer location in the TLB 312 for the missing translations supplied by the TLB data port 306.

Figure 4:
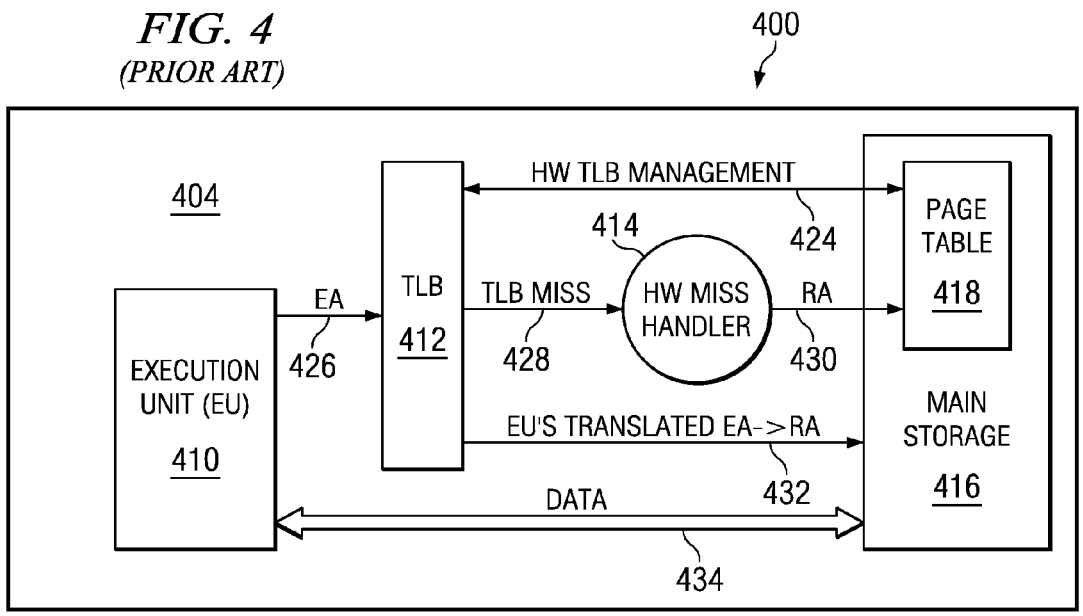
FIG. 4 is a block diagram depicting a conventional hardware-controlled translation mechanism.

Now referring to FIG. 4 of the drawings, the reference numeral 404 generally designates a conventional hardware-controlled Translation Mechanism Implementation. The translation mechanism implementation 404 comprises an EU 410, a TLB 412, a hardware miss handler 414, and a main storage 416. The main storage 416 further includes a page table 418. In addition, main storage 416 can also include memory mapped I/O devices and registers.

Within the translation mechanism implementation 400, there is a plurality of interconnected devices that each performs specific tasks. The EU 410 executes instructions such as those contained in an executable file. Instructions using an EA to reference main storage 416 cause the EU 410 to forward the EA to the TLB 412 for translation. The TLB 412 searches the translation buffers or cache for a translation for the EA. If there does not exist a translation for the EA issued by the EU 410, then the hardware miss handler 414 searches for the unavailable, but required, translation in the page table 418.

Once the proper translation has been found, the translation is loaded into the TLB 412 for future reference and the current EA is converted into an RA. The RA is then communicated to the main storage 416 through a fourth communication channel 432. Once the RA has been transmitted, data can be effectively transferred between the main storage 416 and the EU 410. If the translation is not found in the page table 418, the hardware miss handler 414 typically invokes a software mechanism (not shown) to resolve translations missing in the page table 418.

Within the translation mechanism 404, there exists a variety of connections to allow for the operation of the translation mechanism 404. The EU 410 is coupled to the TLB 412 through a first communication channel 426, wherein the first communication channel 426 transfers an EA to the TLB 412. The TLB 412 is coupled to the page table 418 through a second communication channel 424, wherein the second communication channel 424 provides control data intercommunicated between the TLB 412 and the page table 418. The second communication channel 424 is used by the hardware miss handler 414 to load translations found in the page table 418 into the TLB 412.

The TLB 412 is further coupled to the hardware miss handler 414 through a third communication channel 428, wherein a TLB MISS is communicated from the TLB 412 to the hardware miss handler 414. TLB 412 is also coupled to the main storage 416 through the fourth communication channel 432, wherein an EU's 410 translated RA is communicated from the TLB 412 to the main storage 416.

The hardware miss handler 414 is coupled to the page table 418 through a fifth communication channel 430. The fifth communication channel 430 is used the hardware miss handler 414 to search the page table 418 for the translations missing in the TLB 412. Also, the EU 410 is coupled to the main storage 416 through a sixth communication channel 434, wherein data is inter-communicated between the EU 410 and the main storage 416.

Figure 5:
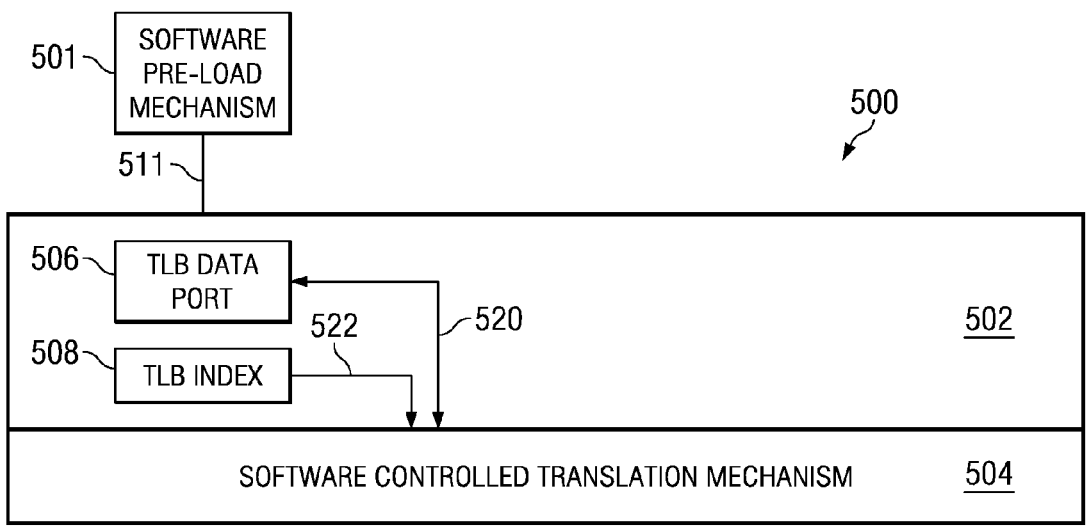
FIG. 5 is a block diagram depicting a Software-controlled Pre-load Translation Mechanism.

Referring to FIG. 5 of the drawings, the reference numeral 500 generally designates a software-controlled translation mechanism in accordance with one illustrative embodiment. The software-controlled translation mechanism 500 is similar to the software-controlled translation mechanism implementation 300 of FIG. 3, with the inclusion of an additional software pre-load mechanism 501. The TLB pre-load translation mechanism 500 comprises a software pre-load mechanism 501, a software-controlled translation mechanism 504, and a software TLB management interface 502. The configurations of mechanism 504 and of software TLB management interface 502 are substantially similar to the mechanism 304 and software TLB management interface 302 of FIG. 3, respectively.

Within the software TLB management interface 502, there exists a variety of connections to allow for the operation of the interface. The TLB data port 506 is coupled to the TLB (not shown but substantially similar to TLB 312 of FIG. 3) of the translation mechanism 504 through the first communication channel 520, wherein translation data is transferred from the TLB data port 506 to the translation mechanism 504. Also, the TLB index 508 is coupled to the translation mechanism 504 through a second communication channel 520. Index data is communicated from the TLB index 508 to the translation mechanism 504 through the second communication channel 522. The TLB index 508 contains the buffer location for the missing translations supplied by the TLB data port 506.

The software pre-load mechanism 501, among other features, distinguishes the software-controlled pre-load translation mechanism 500 of FIG. 5 from any other conventional translation mechanism implementations, such as the translation mechanism implementation 300 of FIG. 3. The software pre-Load mechanism 501 is coupled to the software TLB management interface 502 through a third communication channel 511. The software pre-load mechanism 501 with an extension of the software TLB management interface 502 allows translations to be pre-loaded into a TLB (not shown) from a Page Table (not shown) prior to the running of an application.

As described in greater detail hereafter, the extensions allow for the state of the TLB (not shown) to be saved and restored when swapping tasks running on the execution unit. Pre-loading and restoring of the TLB provide for a reduction in the lag time by warming the associated TLB (not shown). Furthermore, the combination also allows for re-initializing the TLB when switching the context of the processor as opposed to a simple save and restore.

The software pre-load mechanism 501 provides the applications with an interface for requesting the pre-load of translation. The requested translations can also be used to re-initialize the translations when switching the context of the processor. The interface can be an extension of the memory advise or "madvise" operating system call.

The "madvise" call includes an effective address and region size parameter which defines the start and size of an area in main storage for which translations are needed by an application. When receiving a "madvise" call, the software pre-load mechanism 501 searches the page table (not shown) for the translations for the memory area defined by the parameters. Once the translations are found, the software pre-load mechanism 501 loads the translation into the TLB (not shown) using the software TLB management interface 502.

Figure 6:
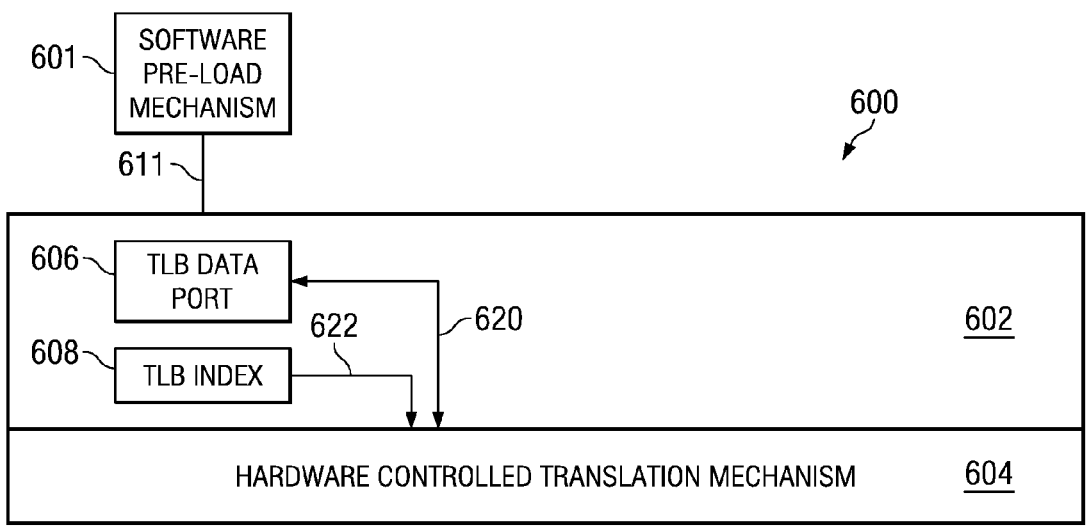
FIG. 6 is a block diagram depicting a Hardware-controlled Pre-load Translation Mechanism.

Referring to FIG. 6 of the drawings, the reference numeral 600 generally designates a hardware-controlled translation mechanism. The hardware-controlled translation mechanism 600 is similar to the hardware-controlled translation mechanism implementation 404 of FIG. 4, with the inclusion of an additional software pre-load mechanism 601 and a software TLB management interface 602.

The hardware-controlled translation mechanism implementation 600 is distinguished from any other conventional hardware-controlled translation mechanism implementations, such as the Implementation 400 of FIG. 4, by the inclusion of a software pre-load mechanism 601, among other features. As shown in FIG. 6, included in the implementation 600 are a Software TLB Management Interface 602 and a Software Pre-Load Mechanism 601. The hardware-controlled translation mechanism implementation 600 also comprises a translation mechanism 604. Moreover, the configuration of the translation mechanism 604 is substantially similar to the translation mechanism 404 of FIG. 4.

The operation of the software pre-load mechanism 601 in the implementation 600 is similar to the operation of the software pre-load translation mechanism 501 of FIG. 5. However, to allow for the software pre-load mechanism 601 to work in a hardware-controlled mechanism, a software TLB management interface 602 is required. The software TLB interface 602 is typically not included in conventional hardware-controlled mechanisms since the TLB is managed by hardware miss handlers.

Within the software TLB management interface 602, there exist a variety of connections to allow for the operation of the interface. The TLB data port 606 is coupled to the TLB 612 (not shown) of the translation mechanism 604 through the first communication channel 620, wherein translation data is transferred from the TLB data port 606 to the translation mechanism 604.

The TLB data port 606 provides a communication port for delivering missing translations to the translation mechanism 604. The TLB index 608 is coupled to the translation mechanism 604 through a second communication channel 622. Index data is communicated from the TLB index 608 to the translation mechanism 604 through the second communication channel 622. The TLB index 608 contains the buffer location for the missing translations supplied by the TLB data port 606.

Included with the hardware-controlled mechanism 600 is a software pre-load mechanism 601. The software pre-load mechanism 601 is coupled to the software TLB management interface 602 through a third communication channel 611. The software pre-load mechanism 601, with an extension of the software TLB management interface 602, allows translations to be pre-loaded into a TLB (not shown) from a page table (not shown) prior to the running of an application. In addition, the extensions allow for the state of the TLB (not shown) to be saved and restored when swapping task running the execution unit. Pre-loading and restoring of the TLB (not shown) provide for a reduction in the lag time by warming the associated TLB (not shown). Furthermore, the combination also allows for re-initializing the TLB when switching the context of the processor as opposed to a simple save and restore.

The software pre-load mechanism 601 provides the applications with an interface for requesting the pre-load of translation. The requested translations can also be used to re-initialize the translations when switching the context of the processor. The interface can be an extension of the memory advise or "madvise" operating system call.

The "madvise" call includes an effective address and region size parameter which defines the start and size of an area in main storage for which translation are needed by an application. When receiving a "madvise" call, the software pre-load mechanism 601 searches the page table (not shown) for the translations for the memory area defined by the parameters. Once the translations are found, the software pre-load mechanism 601 loads the translation into the TLB (not shown) using the software TLB management interface 602.

There are advantages and disadvantages to both a hardware and software-managed TLB (not shown). For example, the latency for resolving a TLB miss is less in a hardware-managed TLB mechanism than a software-managed TLB mechanism. However, there is less control of the page table structure and the translations contained in the TLB of a hardware-controlled TLB mechanism. That is, the TLB replacement algorithm and the fetching of the page table in system memory are done by hardware and thus, are fixed. Software has very little control of which TLB entries get replaced when a new translation is needed. Likewise, since the fetch of an entry in the page table is done by hardware, the format is fixed by the architecture of the processor and thus, cannot be optimized by software.

The hardware-controlled pre-load translation mechanism 600 of FIG. 6 may further include, in one illustrative embodiment, a configurable hardware miss handler (not shown), which invokes a software miss handler (not shown) when the translation is not found in the TLB (not shown). The inclusion of a configurable hardware miss handler (not shown) allows system software to choose the best method for managing the translations required by an application. Typically this is an Operating System choice. If the target applications for a system are tolerant of the added latency in resolving a TLB miss, or the OS can keep the appropriate translation resident in the TLB, then the best choice is usually a software based method for managing the translations in the TLBs. However, if the target applications are not tolerant of the added latency, or the OS does not deal well with keeping the appropriate translation resident in the TLB, then a hardware based method of managing the translations in the TLB is usually the better choice.

As discussed above, the mechanisms of the illustrative embodiments allow a TLB software pre-load mechanism to pre-load a TLB with address translations prior to an application being initiated or resumed, such as in a context switch. Thereafter, either a software or a hardware mechanism may be utilized to manage the TLB with regard to TLB misses and reloading of translations into the TLB. Thus, in one illustrative embodiment, there is a switch-over from the software-based pre-load mechanism to a hardware-based management mechanism. This switch-over and hardware-based management is performed using a hardware controlled translation mechanism, such as 604 in FIG. 6.

Figure 7:
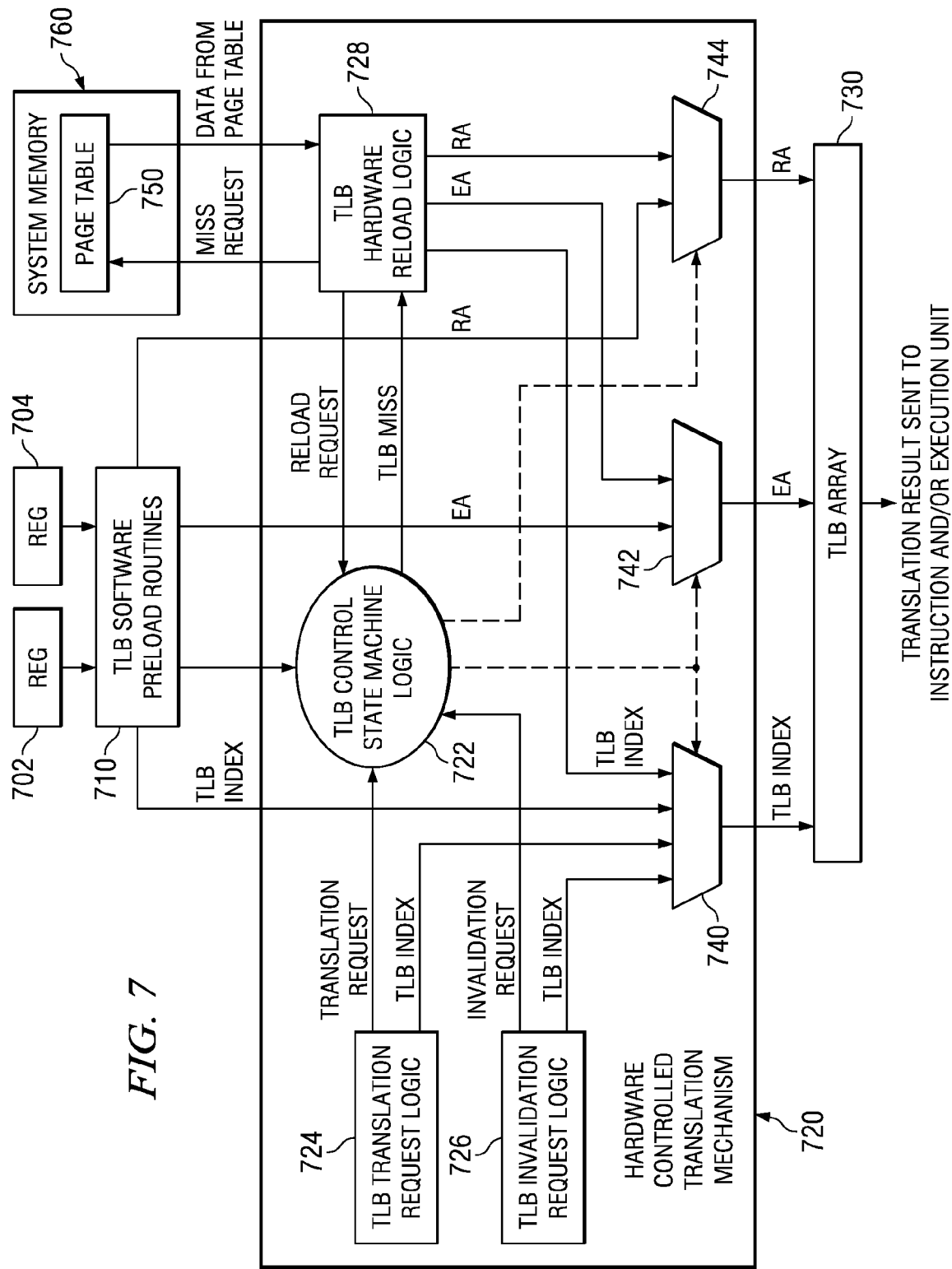
FIG. 7 is an exemplary block diagram illustrating the primary operational components of hardware controlled translation logic and its interaction with TLB software pre-load logic and a TLB array in accordance with one illustrative embodiment.

FIG. 7 is an exemplary block diagram illustrating the primary operational components of hardware controlled translation logic and its interaction with TLB software pre-load logic and a TLB array in accordance with one illustrative embodiment. In FIG. 7, the TLB software pre-load routines 710 may be provided as part of the software pre-load mechanism 601 in FIG. 6, for example, and may be executed on one or more processors of a data processing system, such as that described in FIGS. 1 and 2 above. Similarly, the hardware controlled translation logic 720 may be provided as part of the hardware controlled translation mechanism 604 in FIG. 6, for example, which may be implemented in hardware of a processor and/or data processing system, such as that described in FIGS. 1 and 2 above.

As shown in FIG. 7, the hardware-controlled translation logic 720 comprises TLB control state machine logic 722, TLB translation request logic 724, TLB invalidation request logic 726, TLB hardware reload logic 728, and multiplexers 740-744. The logic elements of the hardware controlled translation logic 720 are preferably implemented in hardware integrated circuitry on one or more integrated circuit chips, for example.

The TLB software preload routines 710 are coupled to the hardware controlled translation logic 720 via various communication channels via which the TLB software preload routines 710 provide inputs to the TLB control state machine 722 and multiplexers 740-744 in order to pre-load the TLB array 730. The TLB hardware reload logic 728 is coupled to the TLB control state machine 722 and the page table 750 via various communication channels through which the TLB hardware reload logic 728 receives input from the TLB control state machine 722 and, in the event of a TLB miss, input from a page table 750 comprising translation data for reload into the TLB array 730.

The TLB control state machine logic 722 is coupled to the TLB translation request logic 724, the TLB invalidation request logic 726, the TLB hardware reload logic 728, and the TLB software pre-load routines 710 via various communication channels. Via these communication channels, the TLB control state machine logic 722 receives inputs from the TLB translation request logic 724, the TLB invalidation request logic 726, the TLB hardware reload logic 728, and the TLB software pre-load routines 710. The TLB control state machine logic 722 provides outputs, via various communication channels, to the TLB hardware reload logic 728 and the multiplexers 740-744. In addition, the TLB translation request logic 724 and the TLB invalidation request logic 726 provide outputs, via communication channels, to the multiplexer 740.

The TLB array 730 is a hardware/software managed cache of a larger table of virtual address translations, i.e. the page table 750, stored in system memory 760. As discussed above, in known mechanisms this TLB array 730 is managed by either software or hardware. The mechanisms of the illustrative embodiments provide functionality to enable both software and hardware management of the TLB array 730 as well as concurrent software and hardware management of the TLB array 730.

The TLB control state machine 722 is basically an arbitration point in the hardware controlled translation logic 720. The TLB control state machine 722 is responsible for arbitrating between different types of TLB requests, e.g., preload requests, translation requests, invalidation requests, reload requests, etc., and for performing updates of the TLB atomically. The TLB control state machine logic 722 is also responsible for invalidating any previously fetched translations if a valid TLB entry is overwritten by an update requested by either the TLB software pre-load routines 710 or TLB hardware reload logic 728.

The TLB software pre-load routines 710 are primarily responsible for watching for software to update designated registers 702 and 704, e.g., the TLB_VPN and TLB_RPN registers, to load a new translation and for initiating pre-loading of the TLB array 730. In response to such an update, the TLB software pre-load routines 710 set the real address (RA), virtual or effective address (EA), and TLB index corresponding to the value written to the designated registers 702, 704 and initiate pre-loading of this TLB array entry via the TLB control state machine logic 722.

The TLB translation request logic 724 watches for an instruction or command to require a read of a translation from the TLB array 730. When this occurs, the TLB translation request logic 730 performs the necessary operations to initiate the reading of the translation data from the TLB array 730.

The TLB invalidation request logic 726 queues requests from various TLB invalidation sources, sets the TLB index for the entry in the TLB array 730 to be invalidated, and presents the request to the TLB control state machine logic 722 for invalidating an entry in the TLB array 730.

The TLB hardware reload logic 728 handles fetching a new translation from the page table 750 in system memory 760. The TLB hardware reload logic 728 operates in response to a TLB miss, i.e. a requested translation not being found in the TLB array 730, to calculate an address in system memory and sends a request to fetch the corresponding page table entries from the page table 750. Typically, multiple entries are returned and the TLB hardware reload logic 728 selects the correct entry from the group of entries fetched from the page table 750. The TLB hardware reload logic 728 then sets the real address, virtual address, and TLB index and initiates the reloading of this entry into the TLB array 730 via the TLB control state machine logic 722.

It should be noted that the hardware controlled translation logic 720 actually combines the use of software pre-load logic provided in the TLB software pre-load routines 710 with hardware based control of TLB array 730 access. Prior to the present invention, at most a single technique was utilized, either software or hardware, but not the combination of both software mechanisms and hardware control of the TLB array 730.

In addition, prior art mechanisms, because they do not utilize both software and hardware mechanisms for controlling the TLB array 730, do not provide the TLB control state machine logic 722 as provided in the mechanisms of the illustrative embodiments. Moreover, since the known mechanisms do not utilize both hardware and software control mechanisms, the known mechanisms do not combine the output of TLB software preload routines 710 with that of TLB hardware reload logic 728.

In operation, when an application instance is to be initiated, or when there is a context switch back to a running application instance, such as in a virtualized environment having multiple logical partitions which may each run separate application instances, the TLB software pre-load logic 710 detects a write to designated registers 702, 704 indicating a desire to preload data for an application instance. This write operation may originate from a virtualization intermediary, such as a hypervisor or the like, which is called by an operating system initiating a new application instance, for example. The data written to the registers 702 and 704 is the address of a page of memory. The page is usually one of a fixed number of page sizes, e.g., 4K bytes. Larger page sizes may be used to reduce the number of TLBs required to map an application address space.

In response to the detected write to the registers 702 and 704, the TLB software preload routines 710 sets the real address, virtual address, and TLB index and inputs these values into the multiplexers 740, 742, and 744, i.e. sets the input value of the multiplexers to the value written to registers 702 and 704 by the hypervisor or other virtualization intermediary. Thus, the TLB software preload routines 710 output the real address data to the multiplexer 744, the virtual address data to the multiplexer 742, and the TLB index to the multiplexer 740. In addition, the TLB software preload routines 710 send a preload request to the TLB control state machine logic 722. The TLB software preload routines 710 wait for the preload operation to complete and protects the real address, virtual address, and TLB index from changing while the TLB preload operation is in progress.

The real address, virtual address, and TLB index are protected from being changed by virtue of the fact that the TLB software preload routines 710 read the contents of registers 702 and 704 and apply this information to the multiplexer inputs. After the inputs have been applied, the TLB software preload routines 710 make a request to update the TLB array 730. The TLB software preload routines 710 will not read a new value from the registers 702 and 704 until the current update request has completed. Thus, by requiring the TLB software preload routines 710 to wait until the current update is completed before accessing the registers 702 and 704, the real address, virtual address, and TLB index are protected from being changed during the TLB preload operation.

In response to receiving the preload request from the TLB software preload routines 710, the TLB control state machine logic 722 sends a select signal to the multiplexers 740-744 to select the TLB index, virtual address data, and real address data input to the multiplexers 740-744 from the TLB software preload routines 710. As a result, the real address data and virtual address data generated by the TLB software preload routines 710 are written to a TLB entry in the TLB array 730 located at the TLB index generated by the TLB software preload routines 710.

The TLB translation request logic 724 receives instructions or commands, such as from a processor, DMA unit, or other unit with which the mechanism of FIG. 7 is associated, that require a read of a translation from the TLB array 730. When this occurs, the TLB translation request logic 724 sets the TLB index for the translation that is to be read and inputs the TLB index to multiplexer 740. The TLB translation request logic 724 further sends a translation request to the TLB control state machine logic 722 requesting a read from the TLB array 730. As a result, the TLB control state machine logic 722 sends a select signal to the multiplexer 740 causing the TLB index input by the TLB translation request logic 724 to be used to access an entry in the TLB array 730.

If a TLB entry corresponding to the TLB index is not found in the TLB array 730, the TLB control state machine logic 722 sends a TLB miss instruction to the TLB hardware reload logic 728. If a TLB entry corresponding to the TLB index is found in the TLB array 730, the corresponding translation data, i.e. the real address and virtual address in the TLB entry, are output to the instruction and/or execution unit of the processor for use. This allows the instruction or command to continue execution.

For example the address for which the translation is desired is referred to as the effective address (EA). The purpose of the translation in the TLB array 730 is to convert the EA into a real address (RA). In the process of translating the address, a virtual address (VA) is generated, e.g., in the PowerPC this is done by segment registers. Part of the VA is used to index into the TLB and another part is used to compare to the VA values contained in the entries in the set of TLB entries pointed to by the first part of the VA (the set size is implementation dependent). If a match is found, then the EA is successfully translated from the EA to the RA, i.e. there is a TLB hit. If a match is not found, then the EA is not translated, i.e. there is a TLB miss.

The TLB hardware reload logic 728, in response to receiving a TLB miss instruction from the TLB control state machine logic 722, fetches a new translation from the page table 750 in system memory 760. When the TLB miss instruction is received from the TLB control state machine logic 722 a state machine of the TLB hardware reload logic 728 is started which calculates an address in system memory 760 and sends a request to fetch the corresponding page table entries from the page table 750 in system memory 760. The address in system memory 760 may be calculated based on a base pointer (not shown) to the page table in system memory 760, which is maintained in hardware register(s). To get an offset from the base pointer address, the VA generated by the first part of the translation is hashed (e.g., an XOR operation) to generate an offset into the page table in system memory 760.

The TLB invalidation request logic 726 queues invalidation requests from a combination of several TLB invalidation sources, e.g., a TLBIE{1} instruction, snooped TLBIE bus operation, or a software register invalidation. In response to a TLB invalidation request, the TLB invalidation request logic 726 sets the TLB index for the TLB entry in the TLB array 730 that is to be invalidated and presents the invalidation request to the TLB control state machine logic 722. The TLB control state machine logic 722 then sends a select signal to the multiplexer 740 to thereby select the TLB index set and input to the multiplexer 740 from the TLB invalidation request logic 726.

In response to a request to fetch the corresponding page table entries, such as in the case of a TLB miss, multiple page table entries are returned by the page table 750. The TLB hardware reload logic 728 selects the correct entry from the group of page table entries fetched. The selection may be made by searching the set of entries retrieved based on the hash algorithm (e.g., in the PowerPC architecture 8 entries would be retrieved) for a match with the VA.

The corresponding real address, virtual address, and TLB index for the selected correct page table entry are then set by the TLB hardware reload logic 728 and sent to the multiplexers 740-744. The TLB hardware reload logic 728 then sends a request to the TLB control state machine logic 722 to reload the TLB array 730. As a result, the TLB control state machine logic 722 inputs select signals to the multiplexers 740-744 to thereby select the input from the TLB hardware reload logic 728 which causes the real address and virtual address to then be written to an entry in the TLB array 730 corresponding to the TLB index.

If there is no match of the VA with any of the entries retrieved based on the hash algorithm, then a page fault occurs. The page fault means that either the memory is not mapped or does not exist in the system memory 760 (e.g., the memory is on a file system somewhere). As a result, loading of the data from another storage device occurs in a manner generally known in the art.

Figure 8:
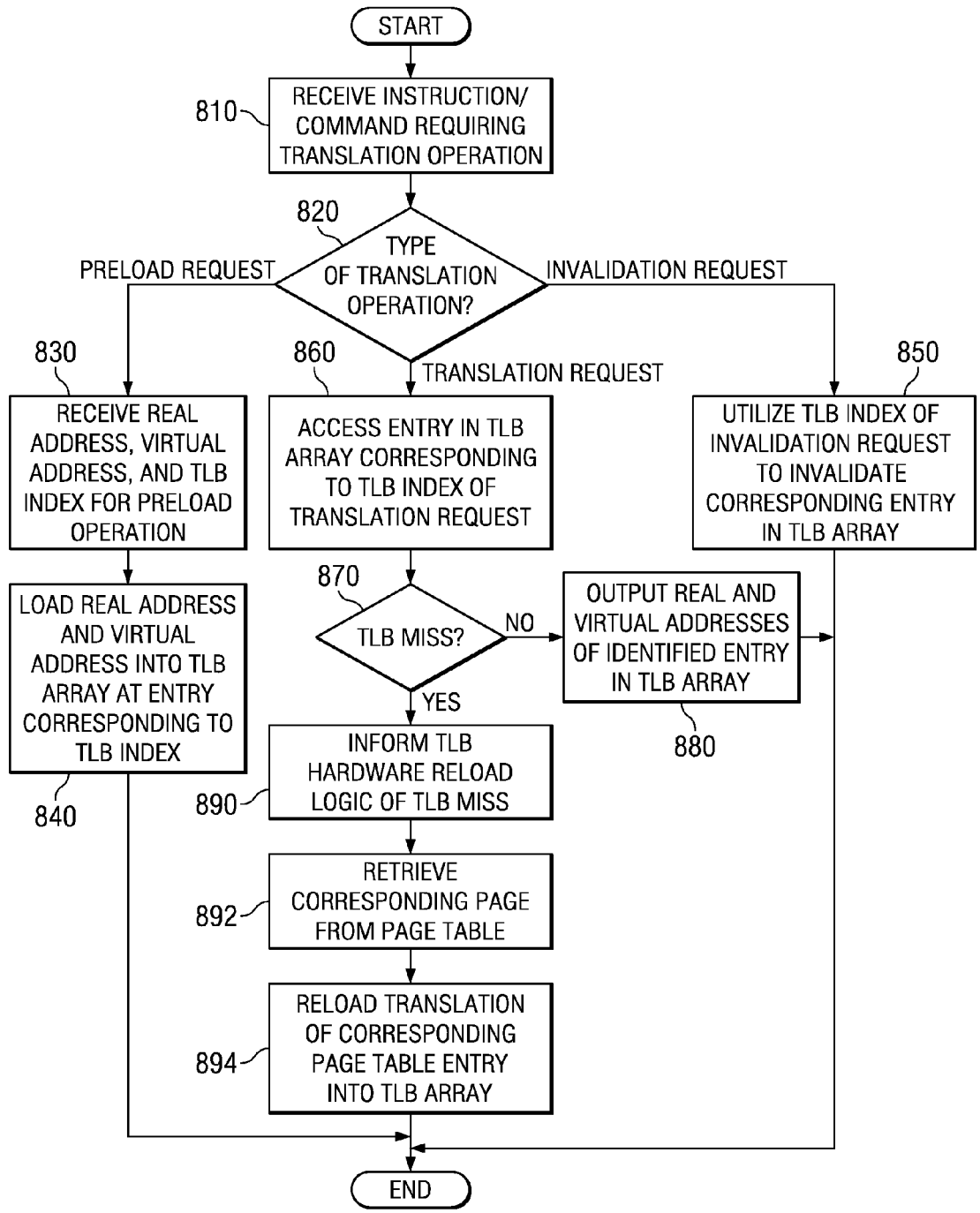
FIG. 8 is a flowchart outlining an exemplary operation of a hardware controlled translation mechanism in accordance with one illustrative embodiment.
Figure 9:
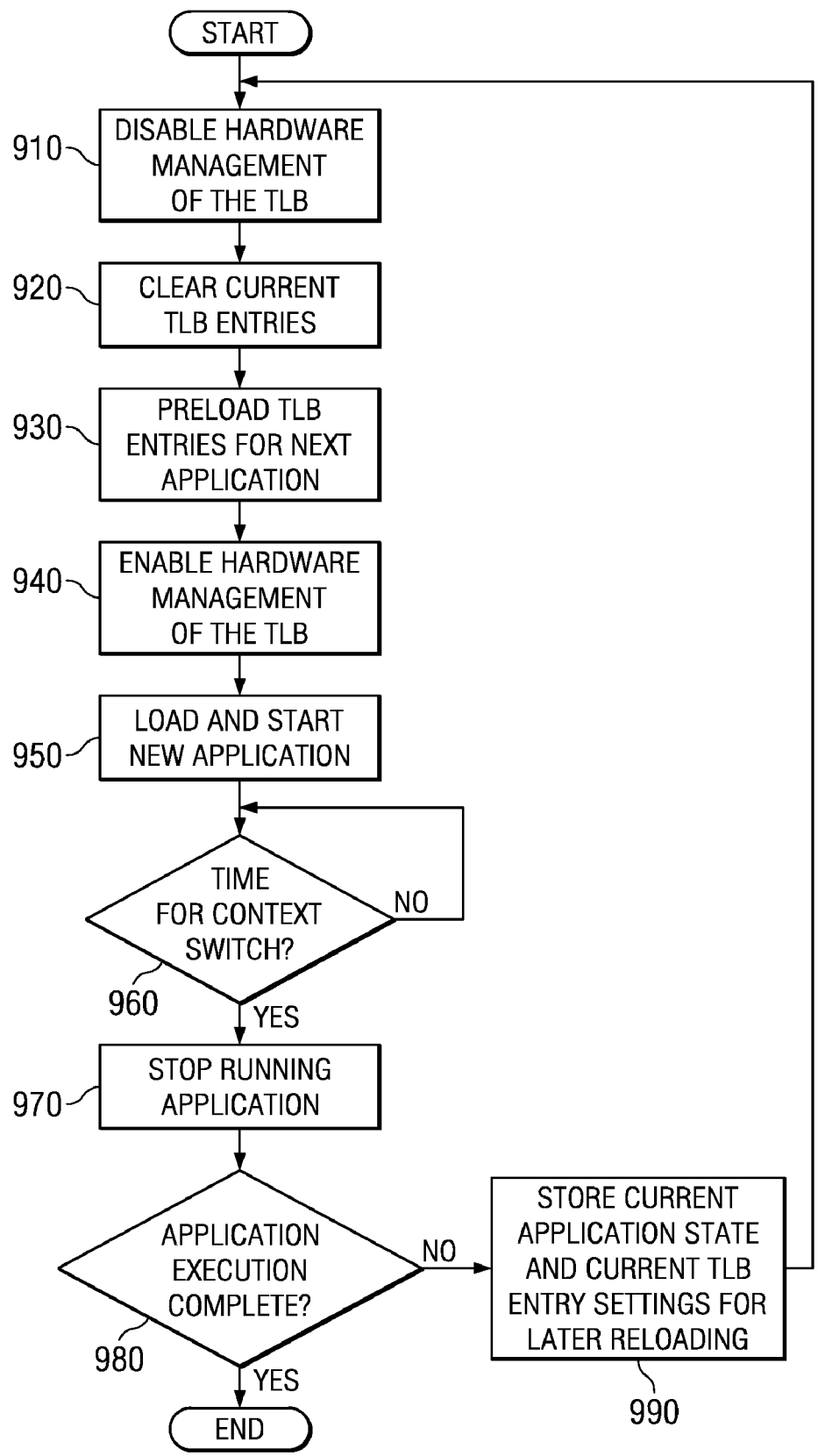
FIG. 9 is a flowchart outlining an exemplary operation for preloading a TLB array with a previously stored set of translations or an initial set of translations, in accordance with one illustrative embodiment.
Figure 10:
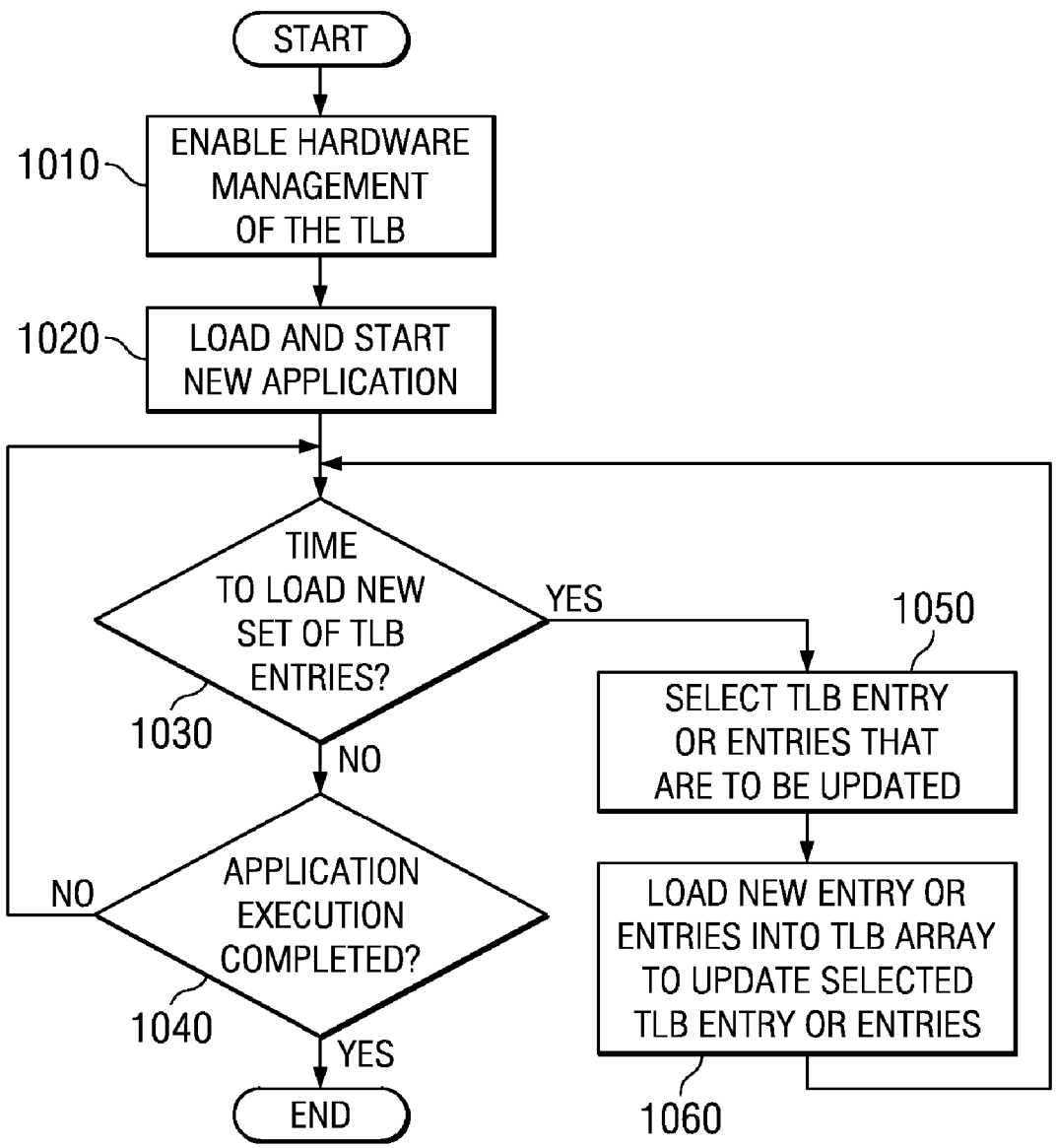
FIG. 10 is a flowchart outlining an exemplary operation for dynamically updating a TLB array in response to an event requiring loading of entries into the TLB array.

FIGS. 8-10 are flowcharts outlining exemplary operations of illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

In a preferred illustrative embodiment, the operations outlined in FIGS. 8-10 are implemented in a combination of software and hardware. For example, the operations attributable to TLB software preload routines may be implemented as software instructions executed by one or more data processing devices. Operations attributable to the hardware controlled translation mechanism may be implemented as hardware logic operations. Thus, in a preferred illustrative embodiment, a combination of concurrent software and hardware management of a TLB array is obtained using the operations outlined in FIGS. 8-10.

FIG. 8 is a flowchart outlining an exemplary operation of a hardware controlled translation mechanism in accordance with one illustrative embodiment. As shown in FIG. 8, the operation starts with the TLB control state machine logic receiving an instruction or command requiring a translation operation to be performed (step 810). TLB control state machine logic determines the type of the request (step 820). If the request is a preload request, the hardware controlled translation mechanism receives the real address, virtual address, and TLB index for the preload operation (step 830). The TLB control state machine logic causes the real address and virtual address to be loaded into a TLB array at an entry corresponding to the TLB index (step 840). The operation then terminates.

If the request is a translation invalidation request, the TLB control state machine logic causes the TLB index of the invalidation request to be utilized to invalidate a corresponding entry in the TLB array (step 850). The operation then terminates.

If the request is a translation request, the TLB control state machine logic causes the TLB index of the translation request to be used to access a corresponding entry in the TLB array (step 860). The TLB control state machine logic determines if a TLB miss occurs (step 870). If not, the real address and virtual address data corresponding to the identified TLB array entry is output to the instruction and/or execution unit for use (step 880).

If a TLB miss occurs, the TLB control state machine logic informs TLB hardware reload logic of the miss (step 890). The TLB hardware reload logic then retrieves a corresponding page table entry from a page table in system memory (step 892) and reloads the translation of the corresponding page table entry into the TLB array (step 894). The operation then terminates.

FIG. 9 is a flowchart outlining an exemplary operation for preloading a TLB array with a previously stored set of translations (such as when switching back to a previously executing task during a context switch) or an initial set of translations when initially starting an application, in accordance with one illustrative embodiment. In the operation outlined in FIG. 9, there is a switch between hardware and software management of the TLB array. This is not absolutely necessary but aids in preventing the preloaded TLB array from being invalidated by other system activity prior to restarting an application.

As shown in FIG. 9, the operation starts with the disabling of hardware management of the TLB (step 910). For example, a bit in the hardware translation mechanism may be set or reset to indicate whether software or hardware translation is enabled. To disable hardware translation, for example, this bit may be set to enable the software translation. The current TLB entries are cleared (step 920) and the TLB entries for the next application are preloaded (step 930). Hardware TLB management is then enabled (step 940) and the new application is loaded and started (step 950).

A determination is made as to whether or not a context switch is to occur (step 960). For example, a virtualization mechanism may cause the switching of logical partition contexts on a regular basis, in response to a communicated need for attention by an operating system of one of the logical partitions, or any other event that may cause the switching of context from one application instance or logical partition to another.

If it is not time to switch the context, the operation returns to step 960. If it is time for a context switch, the running application is stopped (step 970) and a determination is made as to whether the execution of the running application is complete (step 980). If execution of the running application is complete, the operation terminates. Otherwise, if execution of the running application is not complete, the current application state and current TLB entry settings are stored for later reloading into the TLB (step 990). The operation then returns to step 910.

FIG. 10 is a flowchart outlining an exemplary operation for dynamically updating a TLB array in response to an event requiring loading of entries into the TLB array, in accordance with one illustrative embodiment. As shown in FIG. 10, the operation starts with hardware TLB management being enabled (step 1010). A new application is loaded and started (step 1020) and a determination is made as to whether it is time to load a new set of TLB entries (step 1030). Such loading of new TLB entries may be performed, for example, in response to a TLB miss, a context switch, a signal from the application, or the like.

If it is not time to load a new set of TLB entries, a determination is made as to whether the application's execution has completed (step 1040). If so, the operation terminates. If not, the operation returns to step 1030. If it is time to load a new set of TLB entries, the TLB entry or entries that are to be updated are selected (step 1050). A new TLB entry or entries are then loaded into the TLB array to thereby update the selected TLB entry or entries (step 1060). The operation then returns to step 1030.

Thus, with the mechanisms of the illustrative embodiments, an apparatus, system, and method are provided for preloading a translation look-aside buffer with translations prior to executing an application. Such preloading may be performed when an application instance is initially executed or upon a context switch back to a previously executing application instance. Moreover, the illustrative embodiments provide mechanisms for software and hardware management of a translation look-aside buffer. Such software and hardware management may be performed concurrently.

Software managed TLBs give software the most flexibility in managing addresses mapped by the TLB. However, if a TLB miss occurs, the reloading of the TLB is very slow. The reloading performing of hardware managed TLBs is much faster than software based TLB management but software has no control on which addresses are translated by the TLB at any given time.

The mechanisms of the illustrative embodiments permit software the ability to preload the TLBs and let hardware manage any TLB misses after the initial state has been preloaded. Moreover, in one illustrative embodiment, software may be given the ability to load a new set of TLB entries while the application is running while still handing over control to the hardware management mechanisms after loading the new set of TLB entries. For example, when an application gets to a certain point in the execution stream, the application can communicate to an operating system or virtualization intermediary, such as a hypervisor, that a new set of translations are needed and these translations may be loaded into the TLB using the software preload mechanism. Thereafter, hardware mechanisms may be used to handle TLB hits and misses, i.e. accessing the TLB array. As a result, the benefit of software controlled address mapping and hardware controlled TLB miss handling are achieved by the mechanisms of the illustrative embodiments.

While the above illustrative embodiments have been described in the context of preloading and managing translations in a translation look-aside buffer, it should be appreciated that the illustrative embodiments may be utilized with other data storage mechanisms as well. For example, other translation mechanisms may be utilized with the mechanisms of the illustrative embodiments, including segment look-aside buffers (SLBs) and other effective to real address translation (ERAT) mechanisms. Moreover the mechanisms of the illustrative embodiments may be extended to caches and other storage devices used to increase the speed of data access.

It should be appreciated that illustrative embodiments of the present invention may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should also be appreciated that the logic described above with regard to the illustrative embodiments may be provided as part of a circuit in the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design may then be converted into the appropriate format (e.g., GDSII) for the fabrication of photolithographic masks, which typically include multiple copies of the chip design in question that are to be formed on a wafer. The photolithographic masks may be utilized to define areas of the wafer (and/or the layers thereon) to be etched or otherwise processed.

The resulting integrated circuit chips may be distributed by the fabricator in raw wafer form (that is, as a single wafer that has multiple unpackaged chips), as a bare die, or in a packaged form. In the latter case the chip may be mounted in a single chip package (such as a plastic carrier, with leads that are affixed to a motherboard or other higher level carrier) or in a multichip package (such as a ceramic carrier that has either or both surface interconnections or buried interconnections). In any case the chip may then be integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of preloading data into a translation look-aside buffer (TLB) array, comprising:

responsive to detecting, by a software preload mechanism, a write to one or more designated registers indicating a desire to preload data for an application instance, initiating the preloading of data into the TLB array using the software preload mechanism;

performing the preloading of data into the TLB array using both the software preload mechanism and a hardware implemented controller that controls access to the TLB array; and managing the TLB array by the hardware implemented controller after preloading of the data into the TLB array, wherein initiating the preloading and performing the preloading are performed in response to one of an application context switch operation or an application signal indicating that a new set of translations need to be preloaded at a particular point in an execution stream of the application.

2. The method of claim 1, wherein the hardware implemented controller is a hardware controlled translation mechanism having TLB control state machine logic for controlling hardware and software management of the TLB array.

3. The method of claim 2, wherein the TLB control state machine logic arbitrates between different types of TLB requests, performs updates of the TLB atomically, and invalidates any previously fetched translations if a valid TLB entry is overwritten by an update.

4. The method of claim 1, wherein initiating the preloading of data into the TLB array using a software preload mechanism comprises:

reading an updated value from the one or more designated registers, the one or more designated registers storing data indicative of one or more new portions of data to be loaded into the TLB array; and in response to reading an updated value, the software preload mechanism sets a real address (RA), effective address (EA), and index corresponding to the updated value and initiates preloading of the TLB array.

5. The method of claim 1, wherein managing the TLB array by the hardware implemented controller comprises:

receiving an instruction requiring a translation operation;
determining a type of translation operation required by the instruction;
performing a load of new translation information into the TLB array if the instruction is a preload instruction;
performing an invalidation of an entry in the TLB array if the instruction is an invalidation instruction; and
performing a translation of an effective address into a real address if the instruction is a translation instruction.

6. The method of claim 1, wherein managing the TLB array by the hardware implemented controller comprises:

determining a TLB index based on a received effective address;
attempting to access a TLB entry corresponding to the TLB index;
determining if a TLB miss occurs based on results of the attempt to access the TLB entry; and
performing, by TLB hardware reload logic provided in the hardware implemented controller, a reload of a required TLB entry into the TLB array from a page table, if a TLB miss occurs.

7. The method of claim 1, wherein the hardware implemented controller comprises:

TLB control state machine logic that controls an operation of the hardware implemented controller;
TLB translation request logic coupled to the TLB control state machine logic, wherein the TLB translation request logic monitors for an instruction or command requiring a read of a translation from the TLB array and sends a translation request to the TLB control state machine logic; and
TLB hardware reload logic coupled to the TLB control state machine logic, wherein the TLB hardware reload logic fetches a new translation from a page table in system memory in the event of a TLB miss.

8. The method of claim 7, wherein the hardware implemented controller further comprises:

TLB invalidation request logic coupled to the TLB control state machine logic, wherein the TLB invalidation request logic queues requests from various TLB invalidation sources and sends an invalidation request to the TLB control state machine logic to invalidate an entry in the TLB array.

9. The method of claim 7, wherein the hardware implemented controller further comprises:

at least one multiplexer coupled to the TLB control state machine logic, the TLB translation request logic, and the TLB hardware reload logic, wherein the at least one multiplexer multiplexes at least one of TLB index inputs, effective address inputs, or real address inputs from at least one of the TLB control state machine logic, the TLB translation request logic, or the TLB hardware reload logic based on a select signal input received from the TLB control state machine logic.

10. A hardware implemented controller, comprising:
control state machine logic;
a first interface, coupled to the control state machine logic, for communicating with a software preload mechanism; and
a second interface, coupled to the control state machine logic, for communicating with a TLB array, wherein:
responsive to the software preload mechanism detecting a write to one or more designated registers indicating a desire to preload data for an application instance, the software preload mechanism, via the first interface, initiates preloading of data into the TLB array,
the preloading of data into the TLB array is performed using both the software preload mechanism and the control state machine logic of the hardware implemented controller, and
the TLB array is managed by the control state machine logic of the hardware implemented controller after preloading of the data into the TLB array,
wherein initiating the preloading and performing the preloading are performed in response to one of an application context switch operation or an application signal indicating that a new set of translations need to be preloaded at a particular point in an execution stream of the application.

11. The hardware implemented controller of claim 10, wherein the control state machine logic is TLB control state machine logic for controlling hardware and software management of the TLB array.

12. The hardware implemented controller of claim 11, wherein the TLB control state machine logic arbitrates between different types of TLB requests, performs updates of the TLB atomically, and invalidates any previously fetched translations if a valid TLB entry is overwritten by an update.

13. The hardware implemented controller of claim 10, wherein the software preload mechanism initiates the preloading of data into the TLB array by:

reading an updated value from the one or more designated registers, the one or more designated registers storing data indicative of one or more new portions of data to be loaded into the TLB array; and in response to reading an updated value, the software preload mechanism sets a real address (RA), effective address (EA), and index corresponding to the updated value and initiates preloading of the TLB array.

14. The hardware implemented controller of claim 10, wherein the control state machine logic manages the TLB array by:
   receiving an instruction requiring a translation operation;
   determining a type of translation operation required by the instruction;
   performing a load of new translation information into the TLB array if the instruction is a preload instruction;
   performing an invalidation of an entry in the TLB array if the instruction is an invalidation instruction; and
   performing a translation of an effective address into a real address if the instruction is a translation instruction.

15. The hardware implemented controller of claim 10, wherein the control state machine logic manages the TLB array by:
   determining a TLB index based on a received effective address;
   attempting to access a TLB entry corresponding to the TLB index;
   determining if a TLB miss occurs based on results of the attempt to access the TLB entry; and
   performing, by TLB hardware reload logic provided in the hardware implemented controller, a reload of a required TLB entry into the TLB array from a page table, if a TLB miss occurs.

16. The hardware implemented controller of claim 10, wherein the control state machine logic is TLB control state machine logic and wherein the hardware implemented controller further comprises:

TLB translation request logic coupled to the TLB control state machine logic, wherein the TLB translation request logic monitors for an instruction or command requiring a read of a translation from the TLB array and sends a translation request to the TLB control state machine logic; and
   TLB hardware reload logic coupled to the TLB control state machine logic, wherein the TLB hardware reload logic fetches a new translation from a page table in system memory in the event of a TLB miss.

17. The hardware implemented controller of claim 16, wherein the hardware implemented controller further comprises:
   TLB invalidation request logic coupled to the TLB control state machine logic, wherein the TLB invalidation request logic queues requests from various TLB invalidation sources and sends an invalidation request to the TLB control state machine logic to invalidate an entry in the TLB array.

18. The hardware implemented controller of claim 16, wherein the hardware implemented controller further comprises:
   at least one multiplexer coupled to the TLB control state machine logic, the TLB translation request logic, and the TLB hardware reload logic, wherein the at least one multiplexer multiplexes at least one of TLB index inputs, effective address inputs, or real address inputs from at least one of the TLB control state machine logic, the TLB translation request logic, or the TLB hardware reload logic based on a select signal input received from the TLB control state machine logic.

* * * * *